United States Patent
Baumann et al.

(10) Patent No.: US 6,622,833 B2
(45) Date of Patent: Sep. 23, 2003

(54) DRUM BRAKE SYSTEM

(75) Inventors: Dietmar Baumann, Hemmingen (DE); Hanniel Schmidt, Karlsbad (DE); Herbert Vollert, Veihingen (DE); Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,264

(22) PCT Filed: Jul. 26, 2001

(86) PCT No.: PCT/DE01/02826
§ 371 (c)(1),
(2), (4) Date: Jun. 18, 2002

(87) PCT Pub. No.: WO02/10604
PCT Pub. Date: Feb. 7, 2002

(65) Prior Publication Data
US 2002/0162711 A1 Nov. 7, 2002

(30) Foreign Application Priority Data
Aug. 2, 2000 (DE) .......................... 100 37 599

(51) Int. Cl.⁷ ............................................. F16D 51/00
(52) U.S. Cl. ................... 188/336; 188/70 B; 188/71.3; 188/79; 188/343; 188/79.55
(58) Field of Search ................... 188/70 R, 70 B, 188/71.3, 74, 78, 79, 331, 336, 342, 343, 79.55

(56) References Cited

U.S. PATENT DOCUMENTS

| 2,371,503 A | * | 3/1945 | Carter ........................ 188/271 |
| 2,571,432 A | * | 10/1951 | Farkas ......................... 188/79 |
| 2,910,162 A | * | 10/1959 | Goldberg ................ 192/107 T |
| 2,919,771 A | * | 1/1960 | Hughes ........................ 188/78 |
| 2,955,680 A | * | 10/1960 | Caero ........................ 188/70 B |
| 3,066,765 A | * | 12/1962 | Huntress ...................... 188/78 |
| 3,135,361 A | * | 6/1964 | Roberto ....................... 188/78 |
| 3,630,332 A | * | 12/1971 | Price ............................ 192/57 |
| 5,246,093 A | * | 9/1993 | Wang .......................... 188/336 |
| 6,112,863 A | * | 9/2000 | Colletti ..................... 188/77 R |

* cited by examiner

Primary Examiner—Christopher P. Schwartz
Assistant Examiner—Devon Kramer
(74) Attorney, Agent, or Firm—Michael J. Striker

(57) ABSTRACT

The invention relates to a drum brake device (10), which is provided as a wheel brake for a motor vehicle. The invention proposes embodying the drum brake device (10) with a brake belt (14), which is disposed inside a brake drum (12) and can flex in the radial direction of the brake drum (12). Thrust exerted on one end (18) of the brake belt (14) with a simultaneous bracing of the other end (20) of the brake belt (14) causes the brake belt (14) to be pressed against the brake drum (12) from the inside and produces a braking moment. The invention has the advantage that a friction force exerted on the brake belt (14) by the brake drum (12) augments the thrust on the end (18) of the brake belt (14) and thus boosts the braking moment. Another advantage is that the brake belt (14) always rests uniformly against the brake drum (12) over its entire circumference, even, for example, when the brake drum (12) expands due to heating.

7 Claims, 1 Drawing Sheet

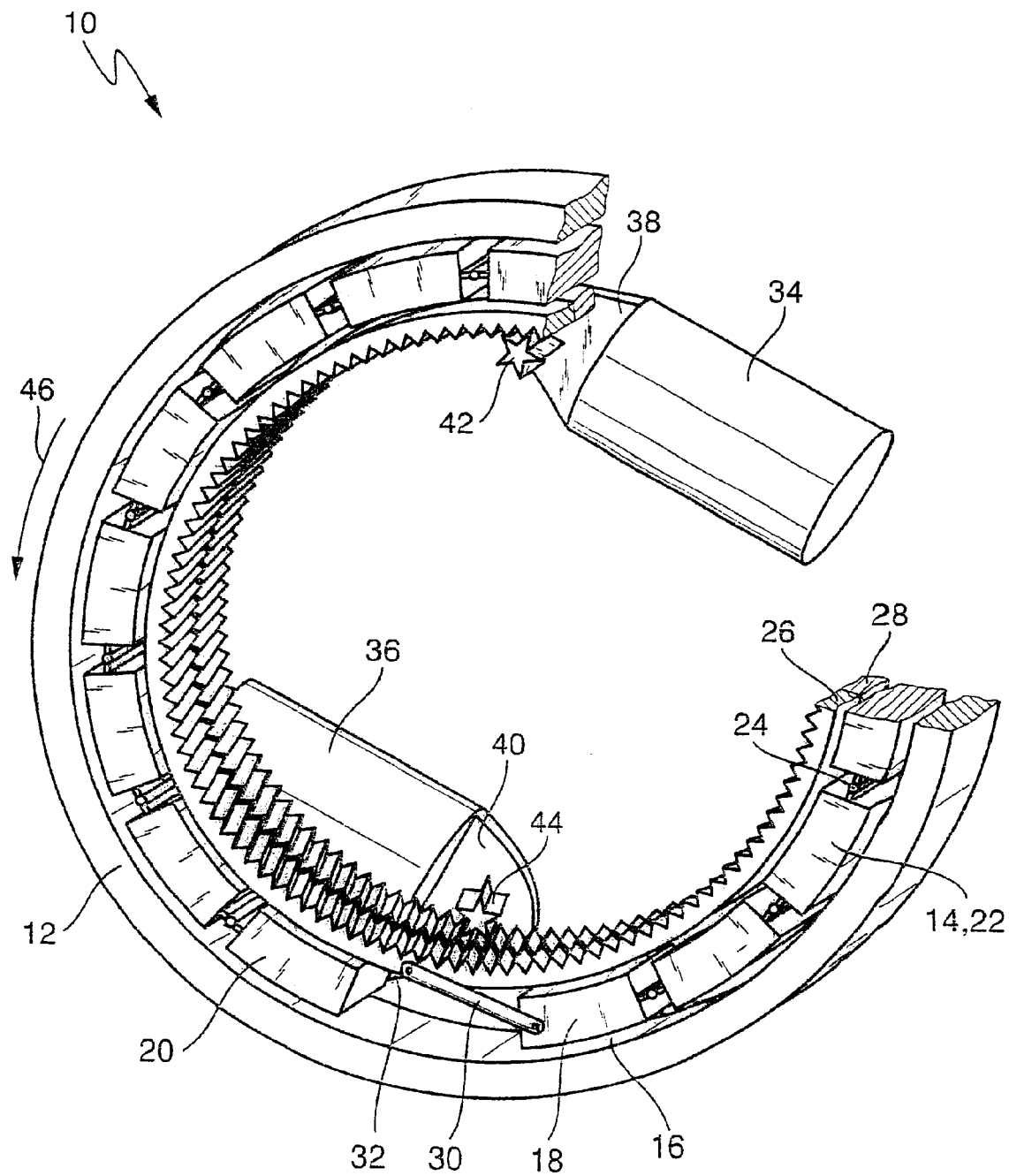

DRUM BRAKE SYSTEM

PRIOR ART

The invention relates to a drum brake device according to the preamble to claim 1, which is particularly provided as a wheel brake for a motor vehicle.

Drum brakes are known in and of themselves. The drum brakes of the known type have two brake shoes, which are disposed inside a brake drum. The brake shoes are pivotably supported at one end and at the other end, can be pressed outward against the brake drum, i.e. from the inside. The pressure of the braced brake shoes against the brake drum produces a braking moment on the brake drum.

One brake shoe in the known drum brakes is leading, i.e. a friction force between the brake drum and the brake shoe augments the contact force of the brake shoe against the brake drum. Another known design is the so-called duplex drum brake in which each of the two brake shoes respectively leads in one rotation direction of the brake drum. The action of the leading brake shoe, which augments the contact force of the brake shoe against the brake drum when the known drum brake is actuated, produces a boosting of the brake force as defined by an increase in a braking moment exerted on the brake drum when there is a given contact force of the brake shoe against the brake drum. Thus a powerful braking moment can be produced with a small contact force of the brake shoe against the brake drum. The boosting of the braking force, however, is limited by the fact that an excessive boosting causes a "wedging" of the leading brake shoe in the brake drum, i.e. the leading brake shoe locks the brake drum due to the friction force exerted on the leading brake shoe by the rotating brake drum without the contact force of the brake shoe against the brake drum being increased. The boosting of the braking force must be chosen to be low enough that a locking of the brake drum due to the friction force it exerts on the leading brake shoe is reliably prevented in every operating state of the drum brake. This self-locking of the drum brake must be reliably prevented at every speed, every contact force of the brake shoe against the brake drum, when the drum brake is cold or hot, and in every wear state of a frictional brake lining of the brake shoes and brake drum.

Another disadvantage of the known drum brakes is that frictional brake linings of new brake shoes have to be adapted to the brake drum through actuation of the drum brake until they rest against the brake drum uniformly over their entire length in the circumference direction (so-called "braking in"). If the brake drum expands due to heating, the frictional brake linings no longer rest against the brake drum uniformly over their entire length in the circumference direction, but rather the contact force increases in a limited circumference region of the brake shoe. In this circumference region, the frictional brake lining can overheat and "vitrify". Then the brake shoe has to be replaced.

ADVANTAGES OF THE INVENTION

The drum brake device according to the invention, with the features of claim 1, has a brake belt instead of brake shoes. The brake belt can flex in the radial direction of the brake drum and is disposed inside the brake drum in the vicinity of its inner circumference. In order to actuate the drum brake device according to the invention, a thrust is exerted on one end of the brake belt, approximately in the circumference direction, and as a result, this end of the brake belt is pressed against the brake drum from the inside. The thrust exerted on the end of the brake belt can also be exerted in an obliquely outward direction, i.e. with a component directed radially outward. During the actuation of the drum brake device, another end of the brake belt is braced in the circumference direction. The thrust exerted on the one end of the brake belt in the circumference direction extends over the entire length of the brake belt so that the brake belt is pressed against the brake drum from the inside over its entire length and thus exerts a braking moment on the brake drum.

It is sufficient if the brake belt extends over a part of the circumference of the drum brake device. Preferably, the brake belt extends over almost the entire circumference of the drum brake device, leaving a distance between the two ends of the brake belt that is small in comparison to the circumference of the brake drum.

The drum brake device according to the invention has the advantage that its brake belt, due to its flexibility in the radial direction of the brake drum, rests uniformly against the inside of the brake drum uniformly over its entire circumferential length, i.e. with a uniform contact force, which is directed radially outward. A localized overloading of the brake belt is prevented. Independent of a wear state of the brake belt and the brake drum, the brake belt always rests uniformly over its entire circumference against the brake drum. Even with a heating and expansion of the brake drum, the brake belt rests uniformly and therefore optimally against the brake drum over its entire length. A localized overheating due to a locally increased contact force of the brake belt against the brake drum is prevented.

When the drum brake device according to the invention is actuated, a friction force exerted by the rotating brake drum on the brake belt produces a force in the circumference direction on the brake belt, which augments the thrust exerted on the one end of the brake belt in order to actuate the drum brake device. The friction force exerted on the brake belt by the brake drum during actuation of the drum brake device increases a braking moment of the drum brake device. The drum brake device according to the invention has a high, controllable boosting of the brake force; a powerful braking moment can be produced with a small thrust (actuation force) on the one end of the brake belt. The term "controllable" is understood to mean that a locking of the brake drum, which is due the boosting of the brake force without an increase in the thrust exerted on the end of the brake belt, is prevented.

Advantageous embodiments and modifications of the invention disclosed in claim 1 are the subject of the dependent claims.

The brake belt of the drum brake device according to the invention can have a brake belt that is continuous in the circumference direction and flexible in the radial direction. The brake belt can, for example, be elastic or supple in the radial direction. In the circumference direction, the brake belt is preferably compressionally rigid so that it does not shorten or only shortens slightly when the drum brake device is actuated. The brake belt can also be embodied by affixing a frictional brake lining, which is continuous or discrete in the circumference direction, to a flexible support belt. In one embodiment of the invention, the brake belt is composed of links that are connected to each other in an articulating fashion (claim 2).

DRAWING

The invention will be explained in detail below in conjunction with an exemplary embodiment shown in the drawing. The sole FIGURE shows a simplified, perspective, schematic depiction of a drum brake device according to the invention.

DESCRIPTION OF THE EXEMPLARY EMBODIMENT

The drum brake device 10 according to the invention, which is shown in the drawing, is provided as a wheel brake for a vehicle wheel of a motor vehicle that is not shown. The drum brake device 10 has a brake drum 12 of which only a circumference wall is shown in the drawing and of which an end wall is omitted in order to permit the remaining parts of the drum brake device 10 to be seen.

In addition, approximately a quarter-segment of the circle is shown broken away from the drum brake device 10 in order to clearly show the design of the drum brake device 10.

A brake belt 14 is disposed inside the brake drum 12. The brake belt 14 is disposed coaxially inside the brake drum 12. When the drum brake device 10 is released, there is a gap 16 between the brake drum 12 and the brake belt 14. The brake belt 14 extends over almost an entire circumference of the brake drum 12; between two ends 18, 20 of the brake belt 14, there is a short distance in comparison to the circumference of the brake drum 12. The brake belt 14 is flexible in the radial direction of the brake drum 12. In the exemplary embodiment shown, the brake belt 14 is composed of links 22 that are connected to each other in a pivoting fashion by means of hinges 24. Imaginary pivot axes of the hinges 24 extend axially parallel to an imaginary rotation axis of the drum brake device 10.

In order to actuate the drum brake device 10, a thrust is exerted on one end (end link) 18 of the brake belt 14, approximately in the circumference direction, and the other end (end link) 20 of the brake belt 14 is fixed in the circumference direction. The thrust on the one end 18 of the brake belt 14 extends over its links 22 to the other braced end 20 of the brake belt 14. As a result of the thrust in the circumference direction, all of the links 22 of the brake belt 14 are pressed radially outward uniformly, i.e. with the same force, and are thus pressed against the brake drum 12 from the inside. This produces a friction force between the brake belt 14 and the brake drum 12, which brakes the brake drum 12. The friction force between the brake drum 12 and the brake belt 14 produces a force in the circumference direction on the brake belt 14 and augments the thrust exerted on the end 18 of the brake belt 14. The drum brake device 10 has a boosting of its brake force in the sense that the thrust, which is exerted on the one end 18 of the brake belt 14 in order to actuate the drum brake device 10, and therefore a braking moment, which is exerted on the brake drum 12, are increased by means of the friction force exerted on the brake belt 14 by the brake drum 12. A powerful braking moment can be generated with a weak thrust on the end 18 of the brake belt 14. The thrust on the end 18 of the brake belt 14 corresponds to an actuation force of the drum brake device 10.

In order to release the drum brake device 10, a tension approximately in the circumference direction is exerted on one end 18, 20 of the brake belt 14.

For actuating and releasing, the drum brake device 10 has two rings, which are disposed coaxial to the drum brake device 10 and can be driven to rotate. In the exemplary embodiment of the invention that is shown and described, the two rings are embodied as annular gears 26, 28 with an internal gearing; they are disposed inside the brake belt 14. Another disposition of the annular gears 26, 28, for example laterally next to the brake belt 14, is fundamentally also possible (not shown). Each of the two annular gears 26, 28 is connected to one end 18, 20 of the brake belt 14 by means of a lever (transfer element) 30, 32. The levers 30, 32 protrude obliquely in relation to a circumference direction, from the annular gear 26, 28 out to the end 18, 20 of the brake belt 14 so that by rotating the annular gear 26, 28, a thrust can be exerted as a pushing force or a tension can be exerted as a pulling force on the end 12, 20 of the brake belt 14 by the lever 30, 32. Due to the oblique position of the lever 30, 32, the thrust has a component directed outward in the radial direction, which is superposed with a component of the thrust in the circumference direction.

In order to rotate the annular gears 26, 28, each annular gear 26, 28 is associated with an electric motor 34, 36 with a flange-mounted linkage mechanism 38, 40, where a gear 42, 44, which is non-rotatably fixed to a driven shaft of the linkage mechanism 38, 40, meshes with the respective annular gear 26, 28. The linkage mechanisms 38, 40 of the electric motors 34, 36 are embodied as self-locking. The rotating drive of an annular gear 26 by the associated electric motor 34, permits a thrust to be exerted on the end 18 of the brake belt 14 by the lever 30, which in the manner described above, presses the brake belt 14 uniformly over its entire length against the brake drum 12 from the inside and produces a braking moment on the brake drum 12. Since the linkage mechanisms 38, 40 of the electric motors 34, 36 are self-locking, the respective other electric motor 36 braces the other end 20 of the brake belt 14 in the circumference direction by means of the flange-mounted linkage mechanism 40, the other annular gear 28, and the lever 32. In order to release the drum brake device 10, a tension is exerted on one end 18, 20 of the brake belt 14 by the lever 30, 32 through reverse rotation of the same annular gear 26 or through rotation of the other annular gear 28 in the same direction.

Preferably, the thrust for actuating the drum brake device 10 is exerted on a front end of the brake belt 14 in the rotation direction of the brake drum 12. Assuming that the brake drum 12 is rotating in the direction indicated by the arrow 46, the thrust is thus exerted on the end of the brake belt 14 that is labeled 18 in the drawing. This end 18 can also be referred to as the leading end of the brake belt 14. The exertion of the thrust on the front end 18 of the brake belt 14 in the rotation direction of the brake drum 12 has the advantage that a friction force exerted on the end 18 by the brake drum 12 acts in the same direction as the thrust that the electric motor 34 exerts on the end 18 of the brake belt 14 by means of the linkage mechanism 38, the annular gear 26, and the lever 30. As a result, the actuation of the drum brake device 10 with the electric motor 34 is assisted by the friction force exerted on the end 18 of the brake belt 14 by the brake drum 12. This has the advantage that a relatively small and low-powered electric motor 34 is sufficient for actuating the drum brake device 10. Another advantage is high dynamics during actuation of the drum brake device 10.

In order to release the drum brake device 10, the other electric motor 36 and its linkage mechanism 40 are used to drive the other annular gear 28 to rotate in the same rotation direction as the one annular gear 26 was driven to actuate the drum brake device 10. The rotation direction of the two annular gears 26, 28 for actuating and releasing the drum brake device 10 is thus the rotation direction 46 of the brake drum 12. The rotation of the annular gear 28 causes the lever 32 to exert a tension on the back end 20 of the brake belt 14 in the rotation direction of the brake drum 12 and releases the brake belt 14 from the brake drum 12 so that the brake drum 12 can freely rotate once more. The back end of the brake belt 14 in the rotation direction 46 of the brake drum 12 can be also referred to as a trailing end 20 of the brake belt 14. The tension on the back end 20 of the brake belt 14 in the rotation direction 46 is augmented by the friction force exerted on the brake belt 14 in the circumference direction by the brake drum 12. The releasing of the drum brake device 10 by means of tension on the back end 20 of the brake belt 14 in the rotation direction of the brake drum 12 therefore also has the advantage of high dynamics and permits the use of a small and low-powered electric motor 36.

Since the linkage mechanisms 38, 40 of the electric motors 34, 36 are self-locking, the electric motors 34, 36 do not have to be constantly supplied with power in order to keep a braking moment constant. This and the actuation- and release-assisting action of the friction force exerted on the brake belt 14 by the brake drum 12 result in a low power consumption of the drum brake device 10, which for this reason, due to the above-described boosting of the brake force, and also due to its high dynamics when actuating and releasing, is well-suited as an electromechanical wheel brake device for a motor vehicle. Since the linkage mechanisms 38, 40 of the electric motors 34, 36 are self-locking and maintain an exerted braking moment without power being supplied to the electric motors 34, 36, the drum brake device 10 is suitable for use as a parking brake.

A rotation of the annular gear 28, e.g. by predetermined a rotation angle, when the drum brake device 10 is released achieves an automatic wear compensation.

In principle, the drum brake device 10 can also be actuated and released by means of only one electric motor 34, one linkage mechanism 38, and one annular gear 26 or also by means of another actuation device, not shown, which can be used to exert a thrust or tension on one end 18 of the brake belt while the other end 20 of the brake belt 14 is fixed in place in the circumference direction. The drum brake device 10 can therefore be simple in design. The more complex design of the drum brake device 10 shown, with two electric motors 34, 36, two linkage mechanisms 38, 40, and two annular gears 26, 28, however, has the above-described advantage that both the actuation and the release are assisted by the friction force exerted on the brake belt 14 by the brake drum 12 and therefore permit the use of small, low-powered electric motors 34, 36. Another advantage of the design of the drum brake device 10 that is shown and described is that in both rotation directions of the brake drum 12, in order to actuate the drum brake device 10, a thrust can be exerted on the front end 18, 20 of the brake belt 14 in the rotation direction of the brake drum 12, and in order to release the drum brake device 10, a tension can be exerted on the back end 18, 20 of the brake belt 14 in the rotation direction of the brake drum 12. The assistance of the actuation or release of the drum brake device 10 is independent of the rotation direction.

What is claimed is:

1. A drum brake device with a brake drum, characterized in that the drum brake device (10) has a brake belt (14), which is disposed inside the brake drum (12) and can flex in the radial direction of the brake drum (12), and in order to actuate the drum brake device (10), this brake belt (14) can be pressed against the brake drum (12) from the inside by a thrust approximately in the circumference direction exerted on one end (18, 20) of the brake belt (14), wherein the brake belt (14) has links (22) that are connected to each other in articulating fashion, wherein the thrust is exerted on a front end (18) of the brake belt (14) in the rotation direction (46) of the brake drum (12), and wherein the drum brake device (10) is released by tension in the circumference direction exerted on a back end (20) of the brake belt (14) in the rotation direction (46) of the brake drum (12).

2. The drum brake device according to claim 1, characterized in that for actuating and releasing, the drum brake device (10) has two rings (26, 28), which are supported so that they can rotate around the same axis as the brake drum (12) and which can be driven to rotate independently of each other, and in that the one ring (26) is connected to the one end (18) of the brake belt (14) by means of a transfer element (30) and the other ring (28) is connected to the other end (20) of the brake belt (14) by means of a transfer element (32).

3. The drum brake device according to claim 2, characterized in that the rings are annular gears (26, 28).

4. The drum brake device according to claim 2, characterized in that the rings (26, 28) are disposed inside the brake belt (14).

5. The drum brake device according to claim 2, characterized in that the drum brake device (10) has an electric motor (34, 36) for driving a ring (26, 28) to rotate.

6. The drum brake device according to claim 3, characterized in that the electric motor (34, 36) has a self-locking linkage mechanism (38, 40).

7. A drum brake device with a brake drum, characterized in that the drum brake device (10) has a brake belt (14), which is disposed inside the brake drum (12) and can flex in the radial direction of the brake drum (12), and in order to actuate the drum brake device (10), this brake belt (14) can be pressed against the brake drum (12) from the inside by a thrust approximately in the circumference direction exerted on one end (18, 20) of the brake belt (14), wherein for actuating and releasing, the drum brake device (10) has two rings (26, 28), which are supported so that they can rotate around the same axis as the brake drum (12) and which can be driven to rotate independently of each other, and wherein the one ring (26) is connected tome one end (18) of the brake belt (14) by means of a transfer element (30) and the other ring (28) is connected to the other end (20) of the brake belt (14) by means of a transfer element (32).

* * * * *